United States Patent
Owens et al.

(10) Patent No.: US 7,162,285 B2
(45) Date of Patent: Jan. 9, 2007

(54) DETECTOR AND METHOD FOR DETECTING TELEPHONE-ACTIVATED DEVICES IN IDLE STATE

(75) Inventors: William R. Owens, Tucson, AZ (US); Jon N. Leonard, Tucson, AZ (US); S. Eric Mattingly, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 265 days.

(21) Appl. No.: 10/664,625

(22) Filed: Sep. 19, 2003

(65) Prior Publication Data

US 2005/0064922 A1   Mar. 24, 2005

(51) Int. Cl.
*H04Q 7/20* (2006.01)

(52) U.S. Cl. ............... 455/575.5; 455/1; 455/67.12; 455/411; 455/410; 340/539.1; 340/539.23; 340/10.1; 340/825.69; 340/815.4; 342/22

(58) Field of Classification Search ............ 455/1, 455/63.4, 456.4, 67.12, 410, 411; D10/98; 342/22; 340/539.1, 539.23, 10.1, 825.69, 340/815.14

See application file for complete search history.

(56) References Cited

U.S. PATENT DOCUMENTS

| | | | |
|---|---|---|---|
| 6,222,458 B1 | 4/2001 | Harris | |
| 6,359,582 B1 * | 3/2002 | MacAleese et al. | 342/22 |
| 6,490,455 B1 | 12/2002 | Park et al. | |
| 6,687,506 B1 * | 2/2004 | Girod | 455/456.4 |

FOREIGN PATENT DOCUMENTS

| | | |
|---|---|---|
| EP | 0 881 850 | 12/1998 |
| EP | 0 881 850 A2 * | 12/1998 |
| WO | WO 98/56130 | 12/1998 |

OTHER PUBLICATIONS

Karl Weiss and Dave Muri. Conventional Local Area Radio Coverage System, Motorola Inc. Technical Developments, vol. 13, Jul. 1991, pp. 67-69.

* cited by examiner

*Primary Examiner*—Lester G. Kincaid
*Assistant Examiner*—Charles Shedrick
(74) *Attorney, Agent, or Firm*—Renner, Otto, Boisselle & Sklar LLP

(57) ABSTRACT

A detector for detecting telephone-activated devices, such as cellular telephones used for remotely triggering explosive devices, includes a transmitter for generating and transmitting a pseudo base station signal corresponding to a base station for a telephone-activated device, and a receiver for receiving and detecting a response signal transmitted by the telephone-activated device. At least part of the transmitter and at least of the receiver may be located within a shield of conductive material, such as a cone-shaped metal shield, that aids in localizing and directing the transmitting of the pseudo base station signal toward an object to be interrogated (with regard to whether or not it contains a telephone-activated device in an idle state). The detector has a response unit for providing a response when a telephone-activated device is detected, such as providing an alarm to an operator or interdicting operation of the telephone-activated device.

30 Claims, 3 Drawing Sheets

DETECTOR AND METHOD FOR DETECTING TELEPHONE-ACTIVATED DEVICES IN IDLE STATE

BACKGROUND OF THE INVENTION

1. Technical Field

The invention relates to apparatus and methods for detecting telephone-activated devices, such as cell telephones, in an idle state or mode.

2. Description of the Related Art

Telephone-activated devices, such as cell telephones, pagers, beepers, etc., have greatly multiplied over the past several years. This has been a boon to users, allowing people to be reachable by telephone, even at times and in places where they are not otherwise reachable at a fixed telephone number. However, this blessing has been a mixed one, in that increasingly, telephone-activated devices intrude into places where ringing tones and/or telephone conversations are unwelcome, such as in theatres, restaurants, and public transportation. In addition, safety concerns have been raised regarding the location of telephone-activated devices in certain situations, for example, in hospitals, aboard aircraft, or within proximity to gasoline pumps used to refuel vehicles. Accordingly, in recent years systems have been put into place to prevent use of cellular telephones in certain designated areas.

One type of system involves area-based detecting a cellular telephone in its idle state, in a certain fixed region such as entryway doorway or room. One example of such an apparatus is described in U.S. Pat. No. 6,490,455, titled "Apparatus and Method for Detecting a Mobile telephone in Idle State." Such a device involves detecting mobile telephones in a fixed detection area, and providing an alarm to an operator when a mobile telephone in a passive or idle state is detected. Such systems are limited to providing coverage in a fixed detection area. Another drawback to such systems is that they provide mere notification only, and do not themselves take any action to prevent mobile telephones from receiving incoming calls.

Another approach is to provide an array of wires along the perimeter of a sensitive area, thereby blocking signals from cellular telephone towers or base stations from entering into the sensitive area to activate any idle-state mobile telephone within the area. An example of this sort of system is described in U.S. Pat. No. 6,222,654, which discloses such a system being located along the perimeter of a gasoline station. As with the area-based detection system described above, the blocking system only operates over a fixed area, and does not prevent cellular telephones from receiving incoming calls outside of the perimeter of the designated area.

One problem that has arisen from the proliferation of inexpensive cellular telephones and other telephone-activated devices is use of such devices to remotely trigger explosive devices. Cellular telephones are inexpensive to obtain, and may be difficult to trace. The battery of a cellular telephone in a passive idle state may last several days, allowing an explosive with a cell-phone trigger to be placed in luggage, cargo, or other locations. Telephone calls over long distances, even over international networks, may be used to detonate such devices. Further, detection of cell pones in the idle state is difficult, because transmissions from cell telephones while in an idle state are short and infrequent, for example, on the order of tens of minutes.

The above-described area-oriented methods of detecting or impeding operation of cellular telephones are ill-suited for detection of telephone-activated devices used as triggers for explosive devices. This is because the above area-oriented systems require use of a dedicated area in which cellular telephones are detected or prevented from operating. Systems which merely prevent cellular telephones from receiving incoming calls in the designated area provide very limited protection, since they do not prevent cellular telephones from receiving incoming calls once they leave the designated area. Systems that provide detection in the designated area may not prevent the receipt of incoming calls in the designated area, and in addition require objects which may contain cellular telephones or other telephone-activated devices to be brought into the designated area. The latter limitation may be significant in situations where objects which may contain a cellular telephone trigger may be spread over a large region, for example, when unloading shipping containers that may have an object containing a cellular telephone in an idle state. Use of such systems over a large area may be prohibitively expensive.

From the foregoing, it will be appreciated that improvements in telephone-activated device detection systems and methods would be desirable.

SUMMARY OF THE INVENTION

According to an aspect of the invention, a detector for detecting telephone-activated devices, includes: a conductive shield having an open end for placing objects that may contain a telephone-activated device, at least in proximity thereto; a transmitter for generating and transmitting a pseudo base station signal corresponding to a base station signal for a telephone-activated device; and a receiver for receiving and detecting a response signal transmitted by the telephone-activated device. The transmitter directs at least at least part of the pseudo base station signal into the shield.

According to another aspect of the invention, a detector for detecting telephone-activated devices, includes: a transmitter for generating and transmitting a pseudo base station signal corresponding to a base station for a telephone-activated device; and a receiver for receiving and detecting a response signal transmitted by the telephone-activated device. The transmitter includes a transmitting antenna and a signal-generating unit coupled to the transmitting antenna, adapted to transmit signals. The signal-generating unit is coupled to a frequency scanner adapted to successively transmit signals, scanning multiple possible base station frequencies. The frequency scanner is coupled to circuitry adapted to stop the scanning when the receiver detects a telephone-activated device, while maintaining transmission at the frequency at which the transmitter was transmitting when the receiver detected the telephone-activated device.

According to yet another aspect of the invention, a method of detecting telephone-activated devices includes for each of multiple possible base station frequencies, transmitting a pseudo base station signal from a transmitter of a telephone-activated device detector to an object; checking, with a receiver of the detector, for receipt of signals from the object indicating presence of a telephone-activated device; and if the presence of a telephone-activated device is detected, activating an interdiction device of the detector to prevent the telephone-activated device from receiving an incoming telephone call.

To the accomplishment of the foregoing and related ends, the invention comprises the features hereinafter fully described and particularly pointed out in the claims. The following description and the annexed drawings set forth in detail certain illustrative embodiments of the invention.

These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, which are not necessarily to scale.

DETAILED DESCRIPTION

Figure 1:
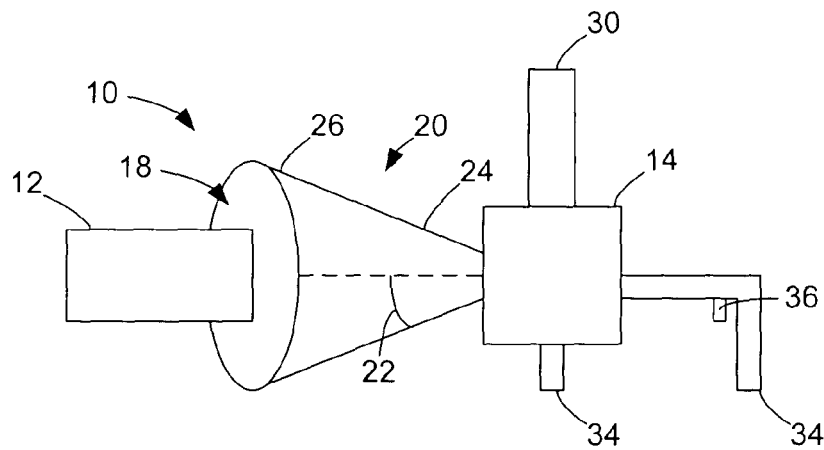
FIG. 1 is a schematic diagram of a telephone-activated device detector in accordance with the present invention.

A detector for detecting telephone-activated devices, such as cellular telephones used for remotely triggering explosive devices, includes a transmitter for generating and transmitting a pseudo base station signal corresponding to a base station for a telephone-activated device, and a receiver for receiving and detecting a response signal transmitted by the telephone-activated device. At least part of the transmitter and at least of the receiver may be located within a shield of conductive material, such as a cone-shaped metal shield, that aids in localizing and directing the transmitting of the pseudo base station signal toward an object to be interrogated (with regard to whether or not it contains a telephone-activated device in an idle state). The detector has a response unit for providing a response when a telephone-activated device is detected. The response includes providing an alarm to an operator that a telephone-activated device has been detected. In addition, the response unit may provide further information associated with the telephone-activated device, such as a telephone number associated with the device or a registration number associated with the device. Further the response unit may include an interdiction unit, for example, a jamming device for interdicting or otherwise affecting operation of the telephone-activated device. Also, the detector may include provisions for maintaining the pseudo base station signal once a telephone-activated device is detected, thereby hastening removal of the telephone-activated device from the registry of such devices maintained by a network of base stations. Eventually this will cause the telephone-activated device to be removed from the network, thereby preventing telephone calls from being placed to the detected telephone-activated device. According to a method, upon detection of a telephone-activated device, an object in which the telephone-activated device is located may be transported to a designated safe area, an area for which incoming signals from base stations are blocked.

Cellular telephone systems work by dividing a geographic area into a number of cells, each of which has a corresponding base station, an antenna-containing tower, and a small building containing radio equipment. When a cellular telephone is switched on, it searches for the strongest signal it can receive from a nearby base station. Once it determines which base station signal is the strongest, it registers with that base station, providing identification information, such as the telephone's telephone number, to the base station so that incoming telephone calls routed to the cellular telephone network can be routed to the base station and directed to the cellular telephone. Also, registration with the base station allows telephone calls to be initiated from the cellular telephone.

While the cellular telephone is in an idle state, on but not initiating, receiving, or involved in a telephone call, the cellular telephone continues receiving one or more signals from base stations. As the cellular telephone changes location, for example, by being within an object that is moving, it eventually reaches a point when it is receiving a stronger signal from another base station, than from the base station it is registered with. At that point it initiates a process of registering with the new base station, sending identifying information such as telephone number to the new base station. The network then associates the cellular telephone with the new base station, and deletes it from the registry of the old base station.

Other telephone-activated devices, such as pagers or beepers, may operate in a similar fashion. Further details regarding the operation of cellular telephone networks may be found in U.S. Pat. No. 6,490,455, the detailed description of which is incorporated herein by reference.

Referring now to FIG. 1, major parts of a detector 10 are shown. The detector 10 is used for determining whether an object 12 contains a telephone-activated device in a passive or idle state. The detector 10 includes a detection unit 14, which houses the main working components of the detector 10. As described in further detail below, the detection unit 14 includes antennas, electronics, a power supply, and other devices for transmitting signals mimicking the signals of a base station. These pseudo base station signals will be of sufficient strength so as to cause any telephone-activated device that is in an idle state and is in the object 12, to send return signals, attempting to register at a new base station. The detection unit 14 includes a receiving antenna and electronics to determine whether a telephone-activated device in the object 12 has attempted to register a response to the signals transmitted by the detection unit 14.

The object 12 is placed against, inserted into or otherwise placed nearby an open end 18 of a conductive shield 20, the other end of which is coupled or attached to the detection unit 14. The shield 20 aids in preventing the transmitted signals from the detection unit 14 from disrupting operation of telephone-activated devices other than those in the object 12. In addition the conductive shield 20 may assist in focusing transmitted energy toward the object 12, and in allowing easier detection of signals emitted by telephone-activated devices in the object 12.

The shield 20 may have a substantially conical shape with a cone angle 22 of the conical shape of up to about 30 degrees. The shield 20 may have other suitable shapes, for example, suitable shapes having a narrow side 24 attached to or close to the detection unit 14, and a wide side 26 adjacent the open end 18. The shield 20 may be made of any suitable conductive material, for example, being made of a suitable conductive sheet metal such as copper, aluminum, steel, or brass. The sheet metal of the shield 20 may have a thickness of from about 0.5 mm to about 5 mm, although it will be appreciated that other thicknesses may be used. As an alternative to sheet metal, the conductive shield 20 may be a conductive mesh, having openings for example less than about 0.5 mm. The conductive shield 20 may be connected to a ground plane of the electronics of the detector 10.

The shield 20 therefore provides a degree of directionality in operation of the detector 10, preventing undesired interference with other telephone-activated devices, and focusing signals toward the open end 18 that receives or is otherwise placed near the object 12. The shield 20 thus provides a degree of directionality to the operation of the detector 10, and advantageously provides an operator of the detector 10 with an intuitive physical cue regarding optimum placement of the object 12. It will be appreciated that the directionality provided by the shield 20 may also reduce power requirements for the detector 10 and may increase discrimination, avoiding false indications of telephone-activated devices that may be due to devices outside of the object 12 but otherwise in the vicinity of the detector 10, for example, devices being in other objects not being tested or being carried by people in the vicinity of the detector 10.

Although the conductive shield 20 potentially provides several advantages as stated above, it will be appreciated that the advantages and potential advantages may be foregone by omitting the conductive shield 20, if desired. Omission of a conductive shield 12 may thus transform the detector 10 from a directional detector to an omnidirectional detector.

Parts of the detection unit 14 may be within or directed into the conductive shield 20, in order to provide better directionality to the director 10 and/or to prevent various components of the detection unit 14 from undesirably interfering with telephone-activated devices that are not in the object 12. For example, the transmitting antenna and/or receiving antenna of the detection unit 14 may be at least partially within, or directed into, the conductive shield 20.

The detector 10 may have a display 30 for displaying results of a detection attempt on the object 12. It will be appreciated that a wide variety of visual or other signals may be used to communicate the results of interrogation of the object 12 to the operator of the detector 10. A first signal may be used to indicate that a telephone-activated device was detected in the object 12, with a second signal used to indicate completion of testing on the object 12 without detection of a telephone-activated device. The signals may be a pair of different colored lights, for example. Another alternative would be to include an alphanumeric display as part of the display 30, with different information provided by different words, numbers, and/or symbols.

Additional information may be provided via the display 30. For example, information regarding a telephone-activated device detected may be provided to the operator of the detector 10. Such information may include the telephone number of the device and/or the registration number of the telephone.

As noted above, a large variety of signals for communicating information to an operator of the detector 10, are possible. Signals may be visual, for example, involving display of any of a variety of colors, shapes and/or symbols. Alternatively, the signals may be aural, for example, involving various tongues or recorded spoken words.

The detector 10 has handles 34 for allowing easy movement and manipulation of the detector 10. One of the handles has a trigger switch 36 thereupon, for activating and deactivating the detection unit 14. It will be appreciated that a variety of types and configurations of handles and switches may alternatively be utilized. Further, it will be appreciated that the handles 34 and the switch 36 may be omitted altogether, if desired. For example, the detection unit 14 may be fitted with a sensor, such as an infrared sensor, that senses when an object is placed within the conductive field 20, and switches on and activates the detection unit 14 when an object is detected. Alternatively, the detector 10 may be configured such that the detection unit 14 is continuously in operation when power is supplied.

The detector 10 may be a lightweight detector suitable for carrying by an operator from place to place. The detector 10 may have a total weight of no greater than about 2.3 kg (5 pounds). Indeed, the detector 10 may have an overall weight of no greater than about 0.9 kg (2 pounds), and even may have an overall weight of no greater than about 0.45 kg (1 pound). However, it will be appreciated that the detector may be mounted in a fixed location, and may have a greater weight, if desired.

Figure 2:
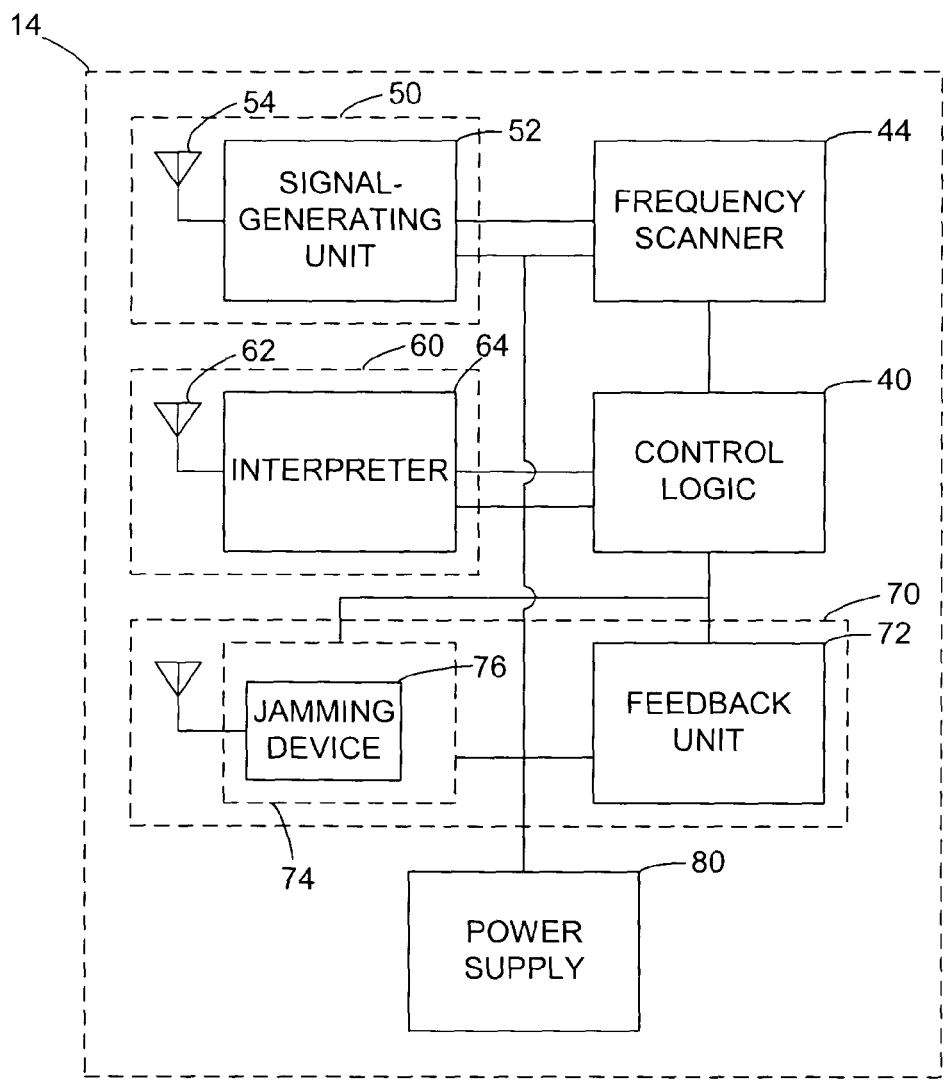
FIG. 2 is a block diagram of components of the detection unit of the detector of FIG. 1.

FIG. 2 shows a block diagram of the major working parts of the detection unit 14. Control logic 40 provides overall control for the detection unit 14, for directing the functions of the detection unit 14 described herein. The control logic 40 includes circuitry embodied in any of a variety of suitable devices including hardware and/or software, for example one or more suitable integrated circuits. The control logic 40 is coupled to a frequency scanner 44 that maintains information regarding suitable frequencies and/or other characteristics of pseudo base station signals to be generated and transmitted by the detection unit 14. The frequency scanner 44 may maintain the information regarding frequencies, signal formats, and other signal characteristics in a suitable memory device.

A transmitter 50 transmits the pseudo base station signals directed at the object 12 (FIG. 1). The transmitter 50 includes a signal-generating unit 52 and a transmitting antenna 54. The signal-generating unit 52 receives information from the frequency scanner 44 and prepares signals of suitable frequency and configuration corresponding to a base station signal. The pseudo base station signal is generated by the signal-generating unit 52 and then transmitted by the transmitting antenna 54. The transmitting antenna 54 may be a directional antenna, having a narrow beam directed in a certain direction or narrow range of directions. The transmitting antenna 54 may be oriented so as to be at least partly within, and/or directed into, the conductive shield 20. The transmitting power of the transmitter 50 may be on the order of about 10 milliwatts.

As discussed above, when a telephone-activated device receives the strong pseudo base station signal, it attempts to register itself with what it perceives to be a new base station, and it sends a registration signal to what it perceives to be the new base station. This registration signal is received and interpreted by a receiver 60, which includes a receiving antenna 62 and an interpreter 64. The receiving antenna 62 receives the transmission from the telephone-activated device, and forwards it to the interpreter 64. The interpreter 64 processes the received signal, and interprets it to determine whether it is from a telephone-activated device. The interpreter 64 may also extract information associated with the telephone-activated device, such as a telephone number associated with the device and a registration number associated with the telephone-activated device.

Once a telephone-activated device is detected by the interpreter 64, a response unit 70 is instructed by the control logic 40 to take appropriate action. The response unit 70 includes a feedback unit 72 and an interdiction device 74. The feedback unit 72 provides feedback to an operator of the detector 10, for example, via the display 30 (FIG. 1). As discussed above, the information may be forwarded to the operator in any of a variety of suitable ways. The information may be a simple indication that a telephone-activated device has been detected, or may include additional information regarding the identifying characteristics of the telephone-activated device.

The interdiction device 74 may be configured to automatically take action to prevent the telephone-activated device from receiving transmissions corresponding to a telephone call. For example, the interdiction device 74 may be or include a jamming device 76 that blocks incoming transmissions from the detected telephone-activated device. Suitable such jamming devices are commercially available as stand-alone units. An example of such a stand-alone unit is the C-guard HP high powered jammer available from Netline Communications Technologies, of Tel Aviv, Israel. A jamming signal from the jamming device 76 may be directed into the conductive shield 20.

Alternatively or in addition, the interdiction device 74 may take actions to disable the telephone-activated device itself from receiving incoming calls, or in removing the telephone-activated device from the network where it is registered. In conjunction with the transmitting antenna 54, or another suitable antenna, the interdiction device 74 may send one or more appropriate control signals to the telephone-activated device to cause the telephone-activated device to shut itself off, or otherwise disable itself from being able to receiving incoming messages. As a further alternative, the interdiction device 74 may initiate communication with the cellular or other network to which the telephone-activated device is operatively coupled, to get the network to de-register the telephone-activated device from the list of active devices to be contacted by the network for incoming telephone calls. Communication to accomplish de-registration of the detected telephone-activated device may take the form of direct communications between the detector 10 and a suitable base station of the network, or may take other suitable indirect forms of communication, for example, via telephone, computer, or other suitable communication networks.

Further, the detection unit 14 may be configured as soon as a telephone-activated device is detected. Base stations where telephone-activated devices are registered periodically re-initiate contact with the registered devices, in order to confirm that the devices continue to be powered up and able to receive signals. This confirmation of registered devices may occur at periods ranging from, for example, about 30 minutes to about 2 hours. When a base station fails in its attempt to re-register a telephone-activated device that is in its registration list, it drops the device from the registration list, assuming that the telephone-activated device has been turned off or is otherwise no longer able to receive signals. By maintaining a pseudo base station signal of sufficient strength to crowd out other signals from legitimate base stations, the detector 10 may prevent re-registration of the detected telephone-activated device, causing the device to be removed from the list of active or idle devices maintained by the network. Once the detected device is removed from the list of registered devices, the network will not make an attempt to route an incoming call to the device. Thus, by maintaining a pseudo base station signal once a telephone-activated device has been detected, re-registration of the device is prevented, which will eventually cause the telephone-activated device to be dropped from the network, and no longer be able to receiving incoming calls as long as it is not given an opportunity to re-initiate registration with the network. The frequency scanner 44 and/or the control logic 40 may be configured to maintain the transmission of an appropriate pseudo base station at a given frequency upon detection of a telephone-activated device. For example, the pseudo base station signal may be maintained at the same frequency as the pseudo base station signal that provoked a response by the detected telephone-activated device.

The transmission of the pseudo base station signal may be maintained as long as necessary in order to remove the object to a safe area which is shielded from receiving radio signals such as those used by base stations of cellular telephone or other device networks. Other ways that the object 12 may be isolated from receiving signals from an actual base station include placing a metal shroud over the object 12, or placing the object 12 in a suitable metal container.

A power supply 80 is used to provide power to the working components of the detection unit 14. The power supply may be a self-contained power supply within the detection unit 14, for example, a suitable battery back. Alternatively or in addition, the power supply 80 may tap into external power, for example, by plugging into a standard electrical outlet.

Figure 3:
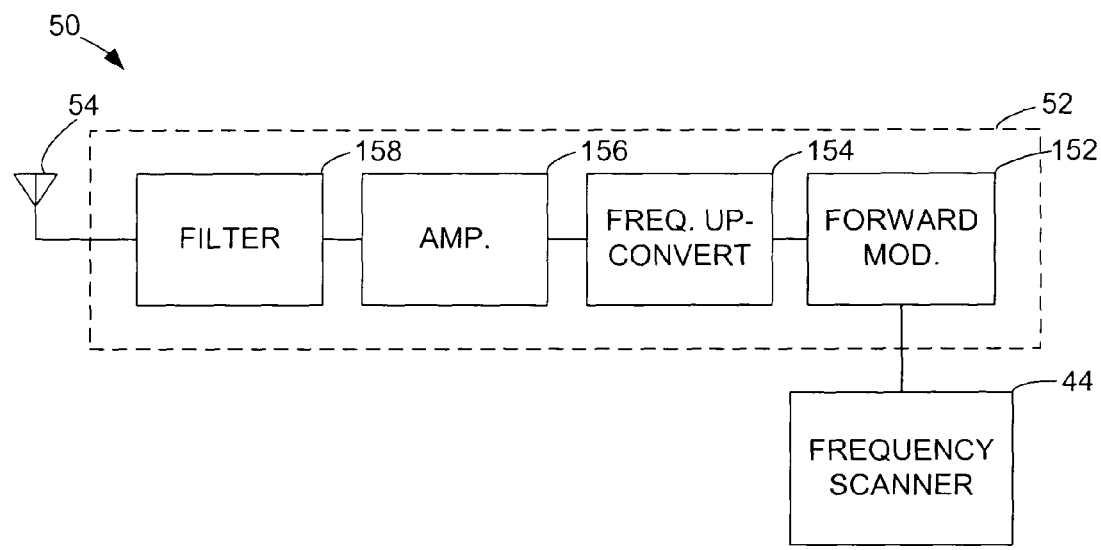
FIG. 3 is a block diagram of components of the transmitter of the detecting unit of FIG. 2.
Figure 4:
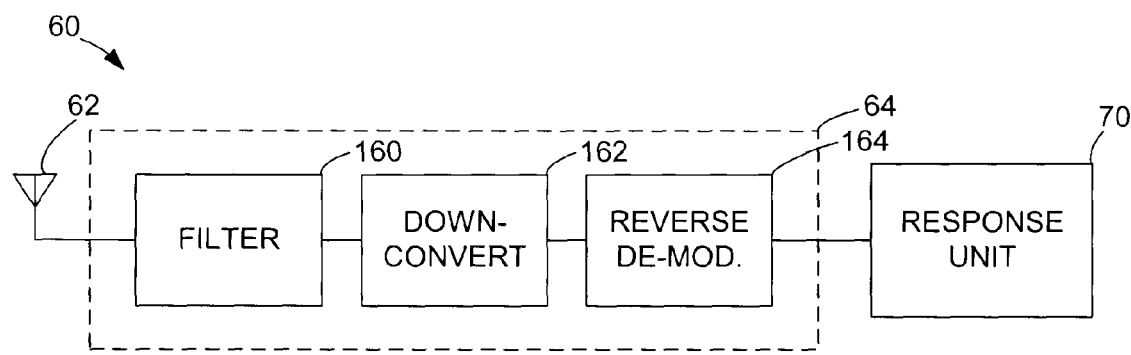
FIG. 4 is a block diagram of components of the receiver of the detecting unit of FIG. 2.

FIGS. 3 and 4 show certain details regarding the components of some of the units described above with regard to FIG. 2. Certain aspects of the details may be similar to corresponding details illustrated and described in U.S. Pat. No. 6,490,455.

FIG. 3 shows a block diagram of some of the components of the signal-generating unit 52. The signal-generating unit 52 receives suitable information from the frequency scanner 44 regarding frequencies and configurations of base station signals. A forward modulator 152 of the signal-generating unit 52 generates an overhead channel signal, utilizing the information from the frequency scanner 44 and a reference clock of the system. A frequency up-converter 154 converts the overhead channel signal to an RF signal at an appropriate frequency used by the corresponding network of base stations. This signal is amplified by an amplifier 156 and is filtered by a transmitting filter 158. The signal is then transmitted using the transmitting antenna 54.

FIG. 4 shows exemplary details of the receiver 60. Signals received by the receiving antenna 62 are forwarded to a receiving filter 160. From there the signals are sent to a receiver frequency down-converter 162. The down-converter 162 converts the filtered received signals to a base band signal. The base band signal is then processed by a reverse demodulator 164. Information from the base band signal is analyzed to see if it corresponds to a registration signal of a telephone-activated device. If so, the response unit 70 is notified, and appropriate action is taken.

It will be appreciated that suitable alternatives may be employed to the up-converting and the down-converting described above.

The detector 10 may be configured to transmit and receive signals at a variety of suitable frequencies, corresponding to the control frequencies utilized by telephone-activated device to be detected. Cellular telephone system transmit at frequencies between 800 and 900 MHz. More particularly, certain telephone systems may utilize frequencies from 824–894 MHz. Other telephone-activated devices may utilize frequencies of approximately 2 GHz (2000 MHz). More particularly, personal communication services may utilize frequencies from 1750–1870 MHz. It will be appreciated that these frequency ranges are only examples, and that the detector 10 may be configured to use other frequency ranges, whether in use at this time or in the future.

Figure 5:
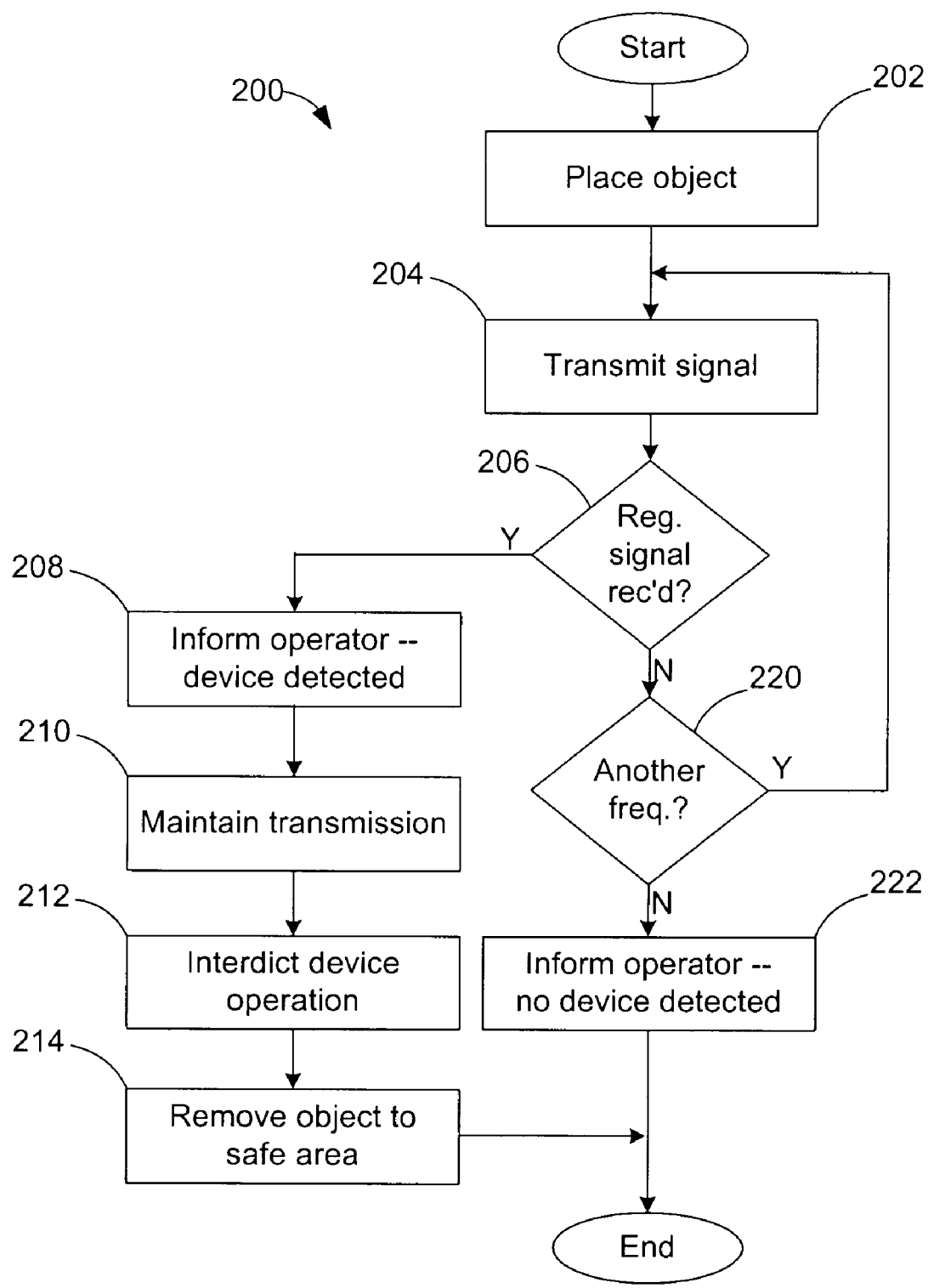
FIG. 5 is a high-level flowchart describing a method that utilizes the detector of FIG. 1 to detect and take action regarding telephone-activated devices.

Turning now to FIG. 5, a high-level flow chart is shown of a method 200 for detecting and responding to telephone-activated devices. The method 200 initiates in step 202 with placement of the object 12 into a suitable position relative to the detector 10. For example, at least partially within, or close to, the conductive shield 20, or otherwise close to the detector 10. The detector 10 may have a range on the order of 5–10 meters (15–30 feet).

Once the object 12 is properly placed relative to the detector 10, transmission of pseudo base station signals in step 204 may be initiated, for example, either by triggering of the switch 36 (FIG. 1), or automatically by detection of the object 12 in proximity to the conductive shield 20. The transmission in step 204 may transmit a pseudo base station signal at a single frequency for a predetermined number of times, with intervals of no transmission between the transmission pulses. As described above, the transmission will in general correspond as closely as possible to an actual base station signal expected by the telephone-activated device. The frequency, duration, and content of the pseudo base station signal may therefore correspond to that of an actual base station signal. It will be appreciated that the content and duration of the pseudo base station signal may be varied for different frequencies, as telephone-activated devices at different frequencies may have different requirements or different types of signals, both in terms of duration and content.

In step 206, the detector 10 determines if a registration signal has been received, indicating the presence of a telephone-activated device in the object 12. If a device is detected, then the detector 10 initiates an appropriate response, executing one or more of the actions in steps 208–212. In step 208, an alert is provided to an operator of the detector 10, indicating that a telephone-activated device has been detected. The signal may take any of the suitable visual and/or aural forms described above. In step 210 the transmitter 50 is instructed to continue transmission of the pseudo base station signal. As described above, this may prevent the detected telephone-activated device from re-registering with the base station unit that it is currently registered with. Eventually, if the detected telephone-activated device is unable to re-register with a base station unit, it will be dropped from the network, and incoming telephone calls bound for the telephone-activated device will be prevented from completion. In step 212, the detector 10 may take steps to actively interdict operation of the detected telephone-activated device. These steps have been described above and may include jamming to prevent signals from reaching the telephone-activated device, and/or taking suitable steps to power down or otherwise de-activate the telephone-activated device, or to remove the telephone-activated device from the registration in the network.

In step 214 the telephone-activated device may also be neutralized by removing it to a safe area or surrounding it with shielding, so as to prevent signals from a legitimate base station from reaching the detected telephone-activated device. This may involve placing the object 12 in an electrically shielded room or container, or in an area where a jamming system prevents entry of signals from a base station. A shipping container itself may be used as a temporary safe area to place the object 12 in, and to prevent it from receiving signals from a base station. At this point, steps may be taken to determine the contents of the object 12, such as whether an explosive device is within the object 12, or whether the object 12 may contain a telephone-activated device innocently left on in an idle state.

If a registration signal is not detected in step 206, then in step 220, the detector 10 determines if another frequency needs to be tested. The frequency scanner 44 (FIG. 2) may contain a list of frequencies to be tested. If another frequency needs to be tested, then the method 200 reverts to step 204 for transmission of a pseudo base station signal at the new frequency. If all of the frequencies have been tested, then in step 222 a message is provided to the operator of the detector 10, indicating that no telephone-activated device has been detected in the object 12. This completes interrogation of the object 12 and the operator knows that he is free to move on to examine the next object.

It will be appreciated that the detector 10 may be configured to transmit pseudo base station signals in a series of frequency channels within the band or bands of frequencies to be checked.

The system and method described herein provide an appropriate means for detecting telephone-activated devices on an object-by-object basis. Portability of the detector 10 allows it to be moved to where the individual objects are, rather than requiring all of the objects to be brought to a specific area. Nonetheless, detectors and methods such as those described herein may be incorporated in area-based detection systems, for example, to check objects moving along a conveyor belt.

The detector and methods described herein provide the ability to take action when a telephone-activated device is detected. First, information such as the device's telephone number or registration number may be provided to the operator of the detector, to enable the corresponding network to be contacted to ensure rapid de-registration from the network. Second, conductive shielding and/or a jamming device may be used to prevent receipt by the telephone-activated device of signals corresponding to an incoming telephone call. Third, the detector 10 may be configured to continue transmitting the pseudo base station signal to which the detected telephone-activated device responded, leading to eventual de-registration of the telephone-activated device from the legitimate base station network. Finally, the detector 10 may itself initiate communication, either directly or indirectly, with the legitimate base station network in order to cause de-registration of the detected telephone-activated device from the network.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A detector for detecting telephone-activated devices, comprising:
   a conductive shield having an open end for placing objects that may contain a telephone-activated device, at least in proximity thereto;
   a transmitter for generating and transmitting a pseudo base station signal corresponding to a base station signal for a telephone-activated device; and a receiver for receiving and detecting a response signal transmitted by the telephone-activated device;
wherein the transmitter directs at least part of the pseudo base station signal into the shield;
wherein the conductive shield is separate from the transmitter and the receiver;
wherein the at least part of the transmitter is within the shield; and
wherein the shield is substantially conical in shape, with the open end at a wide end.

2. The detector of claim 1, wherein at least part of the receiver is within the shield.

3. The detector of claim 2,
wherein the transmitter includes a transmitting antenna at least partially within the shield; and
wherein the receiver includes a receiving antenna at least partially within the shield.

4. A detector for detecting telephone-activated devices, comprising:
a conductive shield having an open end for placing objects that may contain a telephone-activated device, at least in proximity thereto;
a transmitter for generating and transmitting a pseudo base station signal corresponding to a base station signal for a telephone-activated device; and
a receiver for receiving and detecting a response signal transmitted by the telephone-activated device;
wherein the transmitter directs at least part of the pseudo base station signal into the shield; from another end of the shield, toward the open end
wherein the conductive shield is separate from the transmitter and the receiver;
wherein the at least art of the transmitter is within the shield; and
wherein the shield is made of conductive sheet metal.

5. The detector of claim 4, wherein the shield is made of conductive sheet copper.

6. The detector of claim 1,
further comprising a response unit operatively coupled to the receiver;
wherein the response unit generates a response based on a result of operation of the receiver; and
wherein the response unit includes a feedback unit that provides information to an operator regarding the result of the operation of the receiver.

7. The detector of claim 6, wherein the response unit also includes an interdiction device that affects operation of the telephone-activated device.

8. The detector of claim 7, wherein the interdiction device includes a jamming device for preventing the telephone-activated device from being activated.

9. The detector of claim 6, wherein the feedback unit provides a first signal to the operator when the result is That a telephone-activated device is detected, and a second signal to the operator when the result is that a telephone-activated device is not detected.

10. The detector of claim 9, wherein the receiver extracts device information associated from a particular telephone-activated device that is detected; and
wherein the first signal includes the device information.

11. The detector of claim 10, wherein the device information includes a telephone number associated with the particular telephone-activated device.

12. The detector of claim 10, wherein the device information includes a registration number associated with the particular telephone-activated device.

13. A detector for detecting telephone-activated devices, comprising:
a conductive shield having an open end for placing objects that may contain a telephone-activated device, at least in proximity thereto;
a transmitter for generating and transmitting a pseudo base station signal corresponding to a base station signal for a telephone-activated device; and
a receiver for receiving and detecting a response signal transmitted by the telephone-activated device;
wherein the transmitter directs at least part of the pseudo base station signal into the shield;
wherein the conductive shield is separate from the transmitter and the receiver;
wherein the at least part of the transmitter is within the shield; and
wherein the detector has a weight no greater than about 5 pounds (2.3 kg).

14. The detector of claim 13, wherein the detector has a weight no greater than about 2 pounds (0.9 kg).

15. The detector of claim 14, wherein the detector is a portable detector having at least one handle.

16. The detector of claim 14, wherein the detector is a battery-powered detector.

17. The detector of claim 1, wherein the transmitter includes a transmitting antenna and a signal-generating unit that is coupled to the transmitting antenna.

18. The detector of claim 17, wherein the signal-generating unit is coupled to a frequency scanner adapted to successively transmit signals, scanning multiple possible base station frequencies.

19. The detector of claim 18, wherein the frequency scanner is coupled to circuitry adapted to stop the scanning when the receiver detects a telephone-activated device, while maintaining transmission at the frequency at which the transmitter was transmitting when the receiver detected the telephone-activated device.

20. A detector for detecting telephone-activated devices, comprising:
a transmitter for generating and transmitting a pseudo base station signal corresponding to a base station for a telephone-activated device; and
a receiver for receiving and detecting a response signal transmitted by the telephone-activated device;
wherein the transmitter includes a transmitting antenna and a signal-generating unit coupled to the transmitting antenna, adapted to transmit signals;
wherein the signal-generating unit is coupled to a frequency scanner adapted to successively transmit signal, scanning multiple possible base station frequencies;
wherein the frequency scanner is coupled to circuitry adapted to stop the scanning when the receiver detects a telephone-activated device, while maintaining transmission at the frequency at which the transmitter was transmitting when the receiver detected the telephone-activated device; and
wherein the detector has a weight no greater than about 5 pounds (2.3 kg).

21. The detector of claim 20, wherein the detector has a weight no greater than about 2 pounds (0.9 kg).

22. The detector of claim 20, wherein the detector is a portable detector having at least one handle.

23. The detector of claim 1, wherein the shield is made of conductive sheet metal.

24. The detector of claim 23, wherein the shield is made of conductive sheet copper.

25. The detector of claim 1, wherein the detector has a weight no greater than about 5 pounds (2.3 kg).

26. The detector of claim 25, wherein the detector has a weight no greater than about 2 pounds (0.9 kg).

27. The detector of claim 26, wherein the detector is a portable detector having at least one handle.

28. The detector of claim 26, wherein the detector is a battery-powered detector.

29. The detector of claim 25, wherein the shield is made of conductive sheet metal.

30. The detector of claim 29, wherein the shield is made of conductive sheet copper.

* * * * *